(12) United States Patent
Han et al.

(10) Patent No.: US 10,595,011 B2
(45) Date of Patent: Mar. 17, 2020

(54) METHOD AND APPARATUS FOR CONFIGURING SCREEN FOR VIRTUAL REALITY

(71) Applicant: Samsung Electronics Co., Ltd., Gyeonggi-do (KR)

(72) Inventors: Woo-Jung Han, Seoul (KR); Seung-Hwan Hong, Gyeonggi-do (KR); So-Ra Kim, Seoul (KR); Seo-Young Yoon, Seoul (KR)

(73) Assignee: Samsung Electronics Co., Ltd (KR)

( * ) Notice: Subject to any disclaimer, the term of this patent is extended or adjusted under 35 U.S.C. 154(b) by 64 days.

(21) Appl. No.: 14/838,905

(22) Filed: Aug. 28, 2015

(65) Prior Publication Data
US 2016/0065952 A1    Mar. 3, 2016

(30) Foreign Application Priority Data

Aug. 28, 2014  (KR) .................. 10-2014-0113140

(51) Int. Cl.
| | | |
|---|---|---|
| *G06F 3/01* | (2006.01) | |
| *G06K 9/00* | (2006.01) | |
| *H04N 13/344* | (2018.01) | |
| *H04N 13/327* | (2018.01) | |
| *H04N 13/279* | (2018.01) | |
| *H04N 13/194* | (2018.01) | |

(52) U.S. Cl.
CPC ....... *H04N 13/344* (2018.05); *G06K 9/00604* (2013.01); *H04N 13/327* (2018.05); *H04N 13/194* (2018.05); *H04N 13/279* (2018.05)

(58) Field of Classification Search
None
See application file for complete search history.

(56) References Cited

U.S. PATENT DOCUMENTS

| | | | | |
|---|---|---|---|---|
| 2006/0250322 A1* | 11/2006 | Hall | ................... | G02B 27/0172 345/8 |
| 2008/0088529 A1* | 4/2008 | Tang | ................... | G02B 27/0172 345/8 |
| 2008/0231691 A1* | 9/2008 | Larson | ................... | H04N 13/04 348/56 |
| 2009/0096863 A1* | 4/2009 | Kim | ................... | G06K 9/00604 348/42 |

(Continued)

FOREIGN PATENT DOCUMENTS

| | | |
|---|---|---|
| KR | 100294925 | 7/2001 |
| KR | 1020140090968 | 7/2014 |

*Primary Examiner* — Benjamin C Lee
*Assistant Examiner* — Krishna P Neupane
(74) *Attorney, Agent, or Firm* — The Farrell Law Firm, P.C.

(57) ABSTRACT

Methods and apparatuses are provided for configuring a screen of an electronic device. A first object, corresponding to a left eye of a user of the electronic device, and a second object, corresponding to a right eye of the user, are displayed on the screen. A threshold distance is obtained, which is one of a minimum distance and a maximum distance between the first object and the second object at which an image, corresponding to the first object and the second object, is properly viewed by the user. An interpupillary distance (IPD) is determined between the first eye and the second eye based on the threshold distance.

18 Claims, 22 Drawing Sheets

(56) References Cited

U.S. PATENT DOCUMENTS

| | | | |
|---|---|---|---|
| 2010/0079356 A1* | 4/2010 | Hoellwarth | G02B 27/017 |
| | | | 345/8 |
| 2012/0127273 A1* | 5/2012 | Zhang | H04N 13/0011 |
| | | | 348/46 |
| 2014/0104143 A1* | 4/2014 | Benson | G09G 5/00 |
| | | | 345/8 |
| 2014/0132631 A1 | 5/2014 | Komori et al. | |
| 2014/0191927 A1 | 7/2014 | Cho | |
| 2014/0274391 A1* | 9/2014 | Stafford | G06F 3/013 |
| | | | 463/32 |
| 2015/0347080 A1* | 12/2015 | Shin | G09G 3/001 |
| | | | 345/173 |

* cited by examiner

METHOD AND APPARATUS FOR CONFIGURING SCREEN FOR VIRTUAL REALITY

PRIORITY

This application claims priority under 35 U.S.C. § 119(a) to a Korean Patent Application filed in the Korean Intellectual Property Office on Aug. 28, 2014 and assigned Serial No. 10-2014-0113140, the content of which is incorporated herein by reference.

BACKGROUND

1. Field of the Invention

The present invention relates generally to screen configurations of electronic devices, and more particularly, to screen configurations relating to virtual reality (VR).

2. Description of the Related Art

Technologies are being developed that provide VR services using displays or other electronic devices. A display may split a single screen into left and right portions, and may display images corresponding to the user's left and right eyes on the left and right portions of the screen, respectively. Head mounted theater (HMT) apparatuses have been developed that may be integrated with displays to present images on their respective corresponding split screens. When images corresponding to the user's eyes are provided, the user may be provided with VR services.

Interpupillary distance (IPD) may differ for each user. Virtual reality applications offering VR services provide a screen produced by a particular IPD to all users without considering the difference in IPD for each user. Accordingly, some users are not provided with realistic VR services.

SUMMARY

The present invention has been made to address at least the above problems and disadvantages and to provide at least the advantages described below. Accordingly, an aspect of the present invention provides methods and apparatuses for configuring screens to provide realistic VR services for all users.

According to an embodiment of the present invention, a method is provided for configuring a screen of an electronic device. A first object, corresponding to a left eye of a user of the electronic device, and a second object, corresponding to a right eye of the user, are displayed on the screen. A threshold distance is obtained, which is one of a minimum distance and a maximum distance between the first object and the second object for forming an image, corresponding to the first object and the second object. An IPD is determined between the first eye and the second eye based on the threshold distance.

According to an embodiment of the present invention, an electronic device is provided. The electronic device includes a display configured to display a first object, corresponding to a left eye of a user of the electronic device, and a second object, corresponding to a right eye of the user. The electronic device also includes a controller configured to obtain a threshold distance, which is one of a minimum distance and a maximum distance between the first object and the second object for forming an image, corresponding to the first object and the second object, and determine an IPD between the first eye and second eye based on the threshold distance. According to an embodiment of the present invention, a computer-readable storage medium storing a VR application including a first IPD is provided. The VR application displays, on a screen of an electronic device, a first object, corresponding to a left eye of a user of the electronic device, and a second object, corresponding to a right eye of a user of the electronic device. The VR application obtains a threshold distance, which is one of a minimum distance and a maximum distance between the first object and the second object for forming an image, corresponding to the first object and the second object. The VR application determines a second IPD between the first eye and the second eye based on the threshold distance. The VR application updates the first IPD to the second IPD. The VR application displays a VR object based on the second IPD.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION

Figure 1:
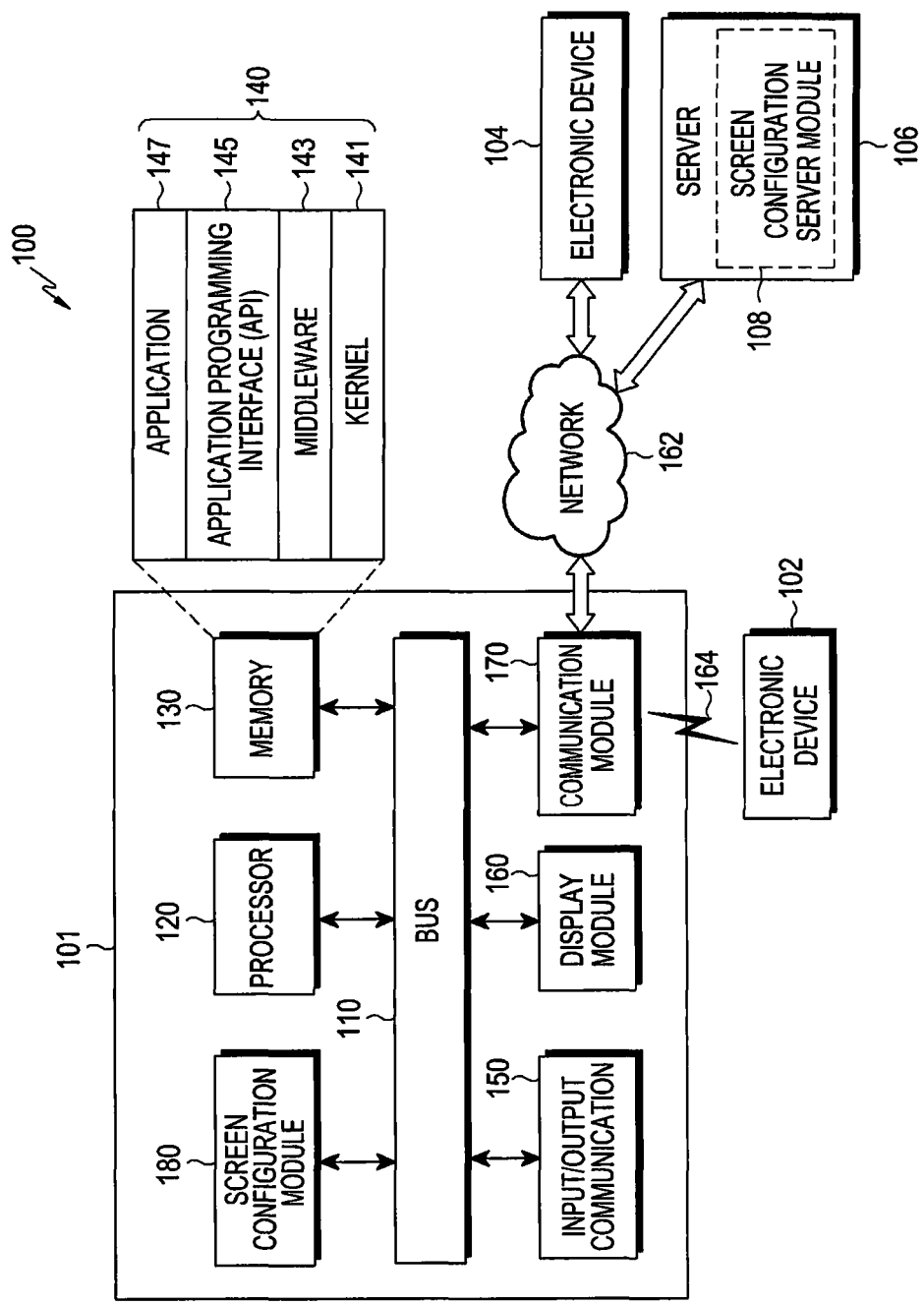
FIG. 1 is a diagram illustrating a network environment including an electronic device, according to an embodiment of the present invention.

Embodiments of the present invention are described in detail with reference to the accompanying drawings. The same or similar components may be designated by the same or similar reference numerals. Detailed descriptions of constructions or processes known in the art may be omitted to avoid obscuring the subject matter of the present invention.

As used herein, the terms "have," "may have," "include," or "may include" indicate the existence of a feature (e.g., a number, a function, an operation, or a component such as a part) and do not exclude the existence of other features.

As used herein, the terms "A or B," "at least one of A and B," or "one or more of A and B" may include all possible combinations of A and B. For example, "A or B," "at least one of A and B," "one or more of A and B" may indicate all of (1) including at least A, (2) including at least B, or (3) including at least A and B.

As used herein, the terms "first" and "second" may modify various components regardless of importance and do not limit the components. These terms are only used to distinguish one component from another. For example, a first user device and a second user device may indicate different user devices regardless of the order or importance of the devices. For example, a first component may be referred to as a second component, and vice versa without departing from the scope of the present invention.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the term "configured (or set) to" may be interchangeably used with the terms "suitable for," "having the capacity to," "designed to," "adapted to," "made to," or "capable of" depending on circumstances. The term "configured (or set) to" does not necessarily mean "specifically designed in hardware to." Rather, the term "configured (or set) to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations. Meanwhile, according to an embodiment of the present invention, the processor may also be referred to as a controller. It should be appreciated by one of ordinary skill in the art that no limitations are imposed on the controller as long as the controller has a configuration that may perform processing.

The terms, as used herein, are provided merely to describe embodiments of the present invention, but not to limit the scope of other embodiments of the present invention. It is to be understood that the singular forms "a," "an," and "the" include plural references unless the context clearly dictates otherwise. All terms including technical and scientific terms used herein have the same meanings as those commonly understood by one of ordinary skill in the art to which the embodiments of the present invention belong. It will be further understood that terms, such as those defined in commonly used dictionaries, should be interpreted as having meanings that are consistent with their meanings in the context of the relevant art and will not be interpreted in an idealized or overly formal sense unless expressly so defined herein. In some cases, the terms defined herein may be interpreted to exclude embodiments of the present invention.

For example, examples of the electronic device, according to embodiments of the present invention, may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (e.g., smart glasses, an HMD, electronic clothes, an electronic bracelet, an electronic necklace, an electronic appcessory, an electronic tattoo, a smart mirror, or a smart watch).

According to an embodiment of the present invention, the electronic device may be embodied as a smart home appliance. For example, examples of the smart home appliance may include at least one of a television, a digital versatile disc (DVD) player, an audio player, a refrigerator, an air conditioner, a cleaner, an oven, a microwave oven, a washer, a drier, an air cleaner, a set-top box, a home automation control panel, a security control panel, a TV box, a gaming console, an electronic dictionary, an electronic key, a camcorder, or an electronic picture frame.

According to an embodiment of the present invention, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller machines (ATMs), point of sales (POS) devices, or Internet of Things (IoT) devices (e.g., a bulb, various sensors, an electric or gas meter, a sprinkler, a fire alarm, a thermostat, a street light, a toaster, fitness equipment, a hot water tank, a heater, or a boiler).

According to various embodiments of the present invention, examples of the electronic device may include at least one of furniture, part of a building/structure, an electronic board, an electronic signature receiving device, a projector, or various measurement devices (e.g., devices for measuring water, electricity, gas, or electromagnetic waves). According to an embodiment of the present invention, the electronic device may be one or a combination of the above-listed devices. According to an embodiment of the present invention, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments of the present invention. As used herein, the term "user" may refer to a human or another device (e.g., an artificial intelligence electronic device) using the electronic device.

Referring to FIG. 1, according to an embodiment of the present invention, a first electronic device 101 is included in a network environment 100. The first electronic device 101 includes a bus 110, a processor 120, a memory 130, an input/output module 150, a display module 160, a communication module 170, and a screen configuration module 180. In some embodiments, the first electronic device 101 may exclude at least one of the components or may add another component.

The bus 110 may include a circuit for connecting the components 120 to 180 with one another and transferring communications (e.g., control messages and/or data) between the components.

The processor 120 may include one or more of a central processing unit (CPU), an application processor (AP), or a communication processor (CP). The processor 120 may control at least one of the other components of the first electronic device 101, and/or perform an operation or data processing relating to communication. The processor 120 may be referred to as a controller, or the processor 120 may include a controller as part thereof.

The memory 130 may include a volatile and/or non-volatile memory. For example, the memory 130 may store commands or data related to at least one other component of the first electronic device 101. According to an embodiment of the present invention, the memory 130 may store software and/or a program 140. The program 140 includes a kernel 141, middleware 143, an application programming interface (API) 145, and/or an application program (or "application") 147. At least a portion of the kernel 141, middleware 143, or API 145 may be referred to as an operating system (OS).

For example, the kernel 141 may control or manage system resources (e.g., the bus 110, the processor 120, or the memory 130) used to perform operations or functions implemented in other programs (e.g., the middleware 143, the API 145, or the application 147). The kernel 141 may provide an interface that allows the middleware 143, the API 145, or the application 147 to access the individual components of the first electronic device 101 to control or manage the system resources.

The middleware 143 may function as a relay to allow the API 145 or the application 147 to communicate data with the kernel 141, for example. A plurality of applications 147 may be provided. The middleware 143 may control work requests received from the applications 147, e.g., by allocating the priority of using the system resources of the first electronic device 101 (e.g., the bus 110, the processor 120, or the memory 130) to at least one of the plurality of applications 147.

The API 145 is an interface allowing the application 147 to control functions provided from the kernel 141 or the middleware 143. For example, the API 145 may include at least one interface or function (e.g., a command) for filing control, window control, image processing or text control.

The input/output module 150 may serve as an interface that may, e.g., transfer commands or data input from a user or other external devices to other component(s) of the first electronic device 101. Further, the input/output module 150 may output commands or data received from other component(s) of the first electronic device 101 to the user or the other external device.

The display module 160 may include, e.g., a liquid crystal display (LCD), a light emitting diode (LED) display, an organic light emitting diode (OLED) display, a microelectromechanical systems (MEMS) display, or an electronic paper display. The display module 160 may display, e.g., various contents (e.g., text, images, videos, icons, or symbols) to the user. The display module 160 may include a touchscreen and may receive, e.g., a touch, gesture, proximity or hovering input using an electronic pen or a body portion of the user.

The communication module 170 may set up communication between the first electronic device 101 and an external device (e.g., a first external electronic device 102, a second external electronic device 104, or a server 106). For example, the communication module 170 may be connected with a network 162 through wireless or wired communication to communicate with the second external electronic device 104.

The wireless communication may use at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM), as a cellular communication protocol. The wired connection may include at least one of universal serial bus (USB), high definition multimedia interface (HDMI), recommended standard 232 (RS-232), or plain old telephone service (POTS). The network 162 may include at least one of a telecommunication network, e.g., a computer network (e.g., local area network (LAN) or wide area network (WAN)), Internet, or a telephone network.

The first and second external electronic devices 102 and 104 each may be the same device type as or a different device type from the first electronic device 101. According to an embodiment of the present invention, the server 106 may include a group of one or more servers. According to an embodiment of the present invention, all or some of operations executed on the first electronic device 101 may be executed on another or multiple other electronic devices (e.g., the first or second external electronic device 102 and 104, or the server 106). According to an embodiment of the present invention, when the first electronic device 101 should perform some function or service, automatically or at a request, the first electronic device 101, instead of executing the function or service on its own, may request another device (e.g., the first or second external electronic device 102 and 104 or the server 106) to perform at least some functions associated therewith. The other electronic devices 102 and 104 or server 106 may execute the requested functions or additional functions and transfer a result of the execution to the first electronic device 101. The first electronic device 101 may provide a requested function or service by processing the received result as it is or using a cloud computing, distributed computing, or client-server computing technique, for example.

According to an embodiment of the present invention, the screen configuration module 180 may drive the first electronic device 101 by performing at least one operation implemented on the first electronic device 101. For example, the server 106 may include a screen configuration server module 108 that may support the screen configuration module 180 implemented in the first electronic device 101. For example, the screen configuration server module 108 may include at least one element of the screen configuration module 180 to perform at least one operation of those operations performed by the screen configuration module 180.

The screen configuration module 180 may process at least part of information obtained from other elements (e.g., at least one of the processor 120, the memory 130, the input/output interface 150, or the communication interface 170) and may use the same in various manners. For example, the screen configuration module 180 may control at least some functions of the first electronic device 101 using the processor 120, or independently from the processor 120, so that the first electronic device 101 may interwork with another electronic device 102 or 104 or the server 106. The screen configuration module 180 may be integrated with the processor 120 or the communication module 170. According to an embodiment of the present invention, at least one configuration of the screen configuration module 180 may be included in the server 106 (e.g., the screen configuration server module 108) and may be supported for at least one operation implemented on the screen configuration module 180 from the server 106.

Figure 2:
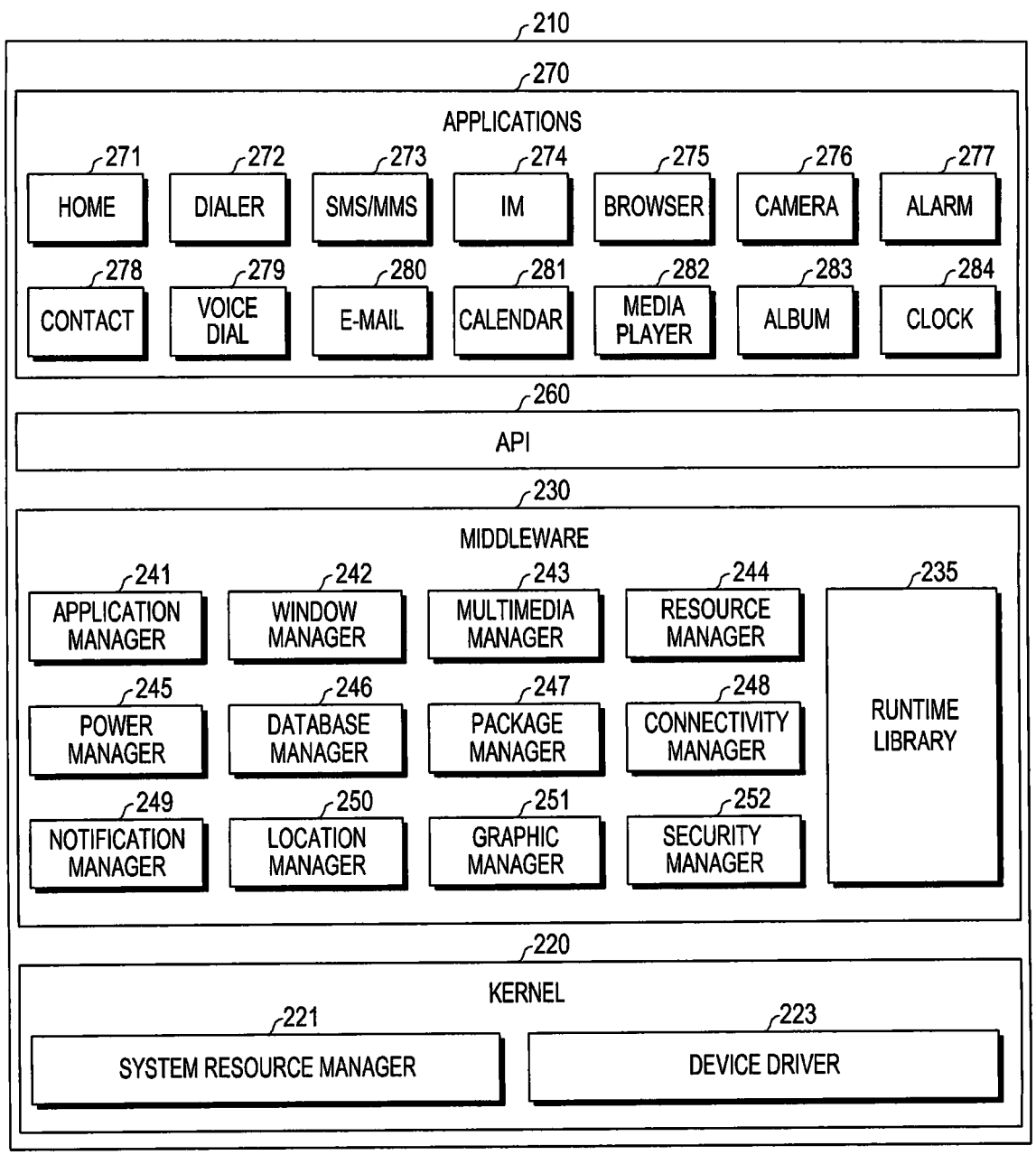
FIG. 2 is a block diagram illustrating a program module, according to an embodiment of the present invention.

FIG. 2 is a block diagram illustrating a program module, according to an embodiment of the present invention. According to an embodiment of the present invention, a program module 210 (e.g., the program 140) may include an operating system (OS) controlling resources related to the first electronic device 101 and/or various applications (e.g., the application processor 147) driven on the operating system.

The program 210 includes a kernel 220, middleware 230, an API 260, and an application 270. At least a part of the program module 210 may be preloaded on the electronic device or may be downloaded from the server 106.

The kernel 220 (e.g., the kernel 141 of FIG. 1) includes a system resource manager 221 and a device driver 223. The system resource manager 221 may perform control, allocation, or recovery of system resources. According to an embodiment of the present invention, the system resource manager 221 may include a process managing unit, a memory managing unit, or a file system managing unit. The device driver 223 may include, e.g., a display driver, a camera driver, a Bluetooth driver, a shared memory driver, a USB driver, a keypad driver, a Wi-Fi driver, an audio driver, or an inter-process communication (IPC) driver.

The middleware 230 may provide various functions to the application 270 through the API 260 so that the application 270 may efficiently use limited system resources in the electronic device or provide functions jointly required by applications 270. According to an embodiment of the present disclosure, the middleware 230 (e.g., middleware 143 of FIG. 1) includes at least one of a runtime library 235, an application manager 241, a window manager 242, a multimedia manager 243, a resource manager 244, a power manager 245, a database manager 246, a package manager 247, a connectivity manager 248, a notification manager 249, a location manager 250, a graphic manager 251, or a security manager 252.

The runtime library 235 may include a library module used by a compiler in order to add a new function through a programming language while, e.g., the application 270 is being executed. The runtime library 235 may perform input/output management, memory management, or operation on arithmetic functions.

The application manager 241 may manage the life cycle of at least one application of, e.g., the applications 270. The window manager 242 may manage GUI resources used on the screen. The multimedia manager 243 may grasp formats necessary to play various media files and use a codec appropriate for a format to perform encoding or decoding on media files. The resource manager 244 may manage resources, such as source code of at least one of the applications 270, memory or storage space.

The power manager 245 may operate together with, e.g., a basic input/output system (BIOS) to manage battery or power and provide power information necessary for operating the electronic device. The database manager 246 may generate, search, or vary a database to be used in at least one of the applications 270. The package manager 247 may manage installation or update of an application that is distributed in the form of a package file.

The connectivity manager 248 may manage wireless connectivity, such as, e.g., Wi-Fi or Bluetooth. The notification manager 249 may display or notify an event, such as an incoming message, an appointment, or a proximity notification, of the user without interfering with the user. The location manager 250 may manage location information on the electronic device. The graphic manager 251 may manage graphic effects to be offered to the user and their related user interface. The security manager 252 may provide various security functions necessary for system security or user authentication. According to an embodiment of the present invention, when the electronic device (e.g., the first electronic device 101) has telephony capability, the middleware 230 may further include a telephony manager for managing voice call or video call functions of the electronic device.

The middleware 230 may include a middleware module forming a combination of various functions of the above-described components. The middleware 230 may be provided with a specified module per type of the operating system in order to provide a differentiated function. Further, the middleware 230 may dynamically omit some existing components or add new components.

The API 260 (e.g., the API 145 of FIG. 1) may be a set of, e.g., API programming functions and may have different configurations depending on operating systems. For example, two or more API sets may be offered per platform.

The application 270 (e.g., the application 147 of FIG. 1) may include one or more applications that may provide functions such as, e.g., home 271, a dialer 272, a short service message (SMS)/multimedia messaging service (MMS) 273, instant messaging (IM) 274, a browser 275, a camera 276, an alarm 277, a contact 278, voice dialing 279, an email 280, a calendar 281, a media player 282, an album 283, a clock 284, health-care (e.g., measuring the degree of workout or blood sugar level), or a provision of environmental information (e.g., provision of air pressure, moisture, or temperature information).

According to an embodiment of the present invention, the application 270 may include an application (hereinafter, "information exchanging application") supporting information exchange between the first electronic device 101 and an external electronic device 102 or 104. Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, healthcare application, or environmental information application) to the external electronic device 102 or 104. Further, the notification relay application may receive notification information from, e.g., the external electronic device and may provide the received notification information to the user. The device management application may perform at least some functions of the external electronic device 102 or 104 communicating with the electronic device (for example, turning on/off the external electronic device (or some components of the external electronic device) or control of brightness (or resolution) of the display). The device management application may manage (e.g., install, delete, or update) an application operating in the external electronic device or a service (e.g., call service or message service) provided from the external electronic device.

According to an embodiment of the present invention, the application 270 may include an application (e.g., a healthcare application) designated depending on the attribute (e.g., as an attribute of the electronic device, the type of electronic device is a mobile medical device) of the external electronic device 102 or 104. According to an embodiment of the present invention, the application 270 may include an application received from the external electronic device (e.g., the server 106 or electronic devices 102 or 104). According to an embodiment of the present invention, the application 270 may include a preloaded application or a third party application downloadable from a server. The names of the components of the program module 210 may vary depending on the type of operating system.

According to an embodiment of the present invention, at least a part of the program module 210 may be implemented in software, firmware, hardware, or in a combination of two or more thereof. At least a part of the programming module 210 may be implemented (e.g., executed) by e.g., a processor (e.g., the API 260). At least a part of the program module 210 may include e.g., a module, program, routine, set of instructions, process, or the like for performing one or more functions.

Figure 3:
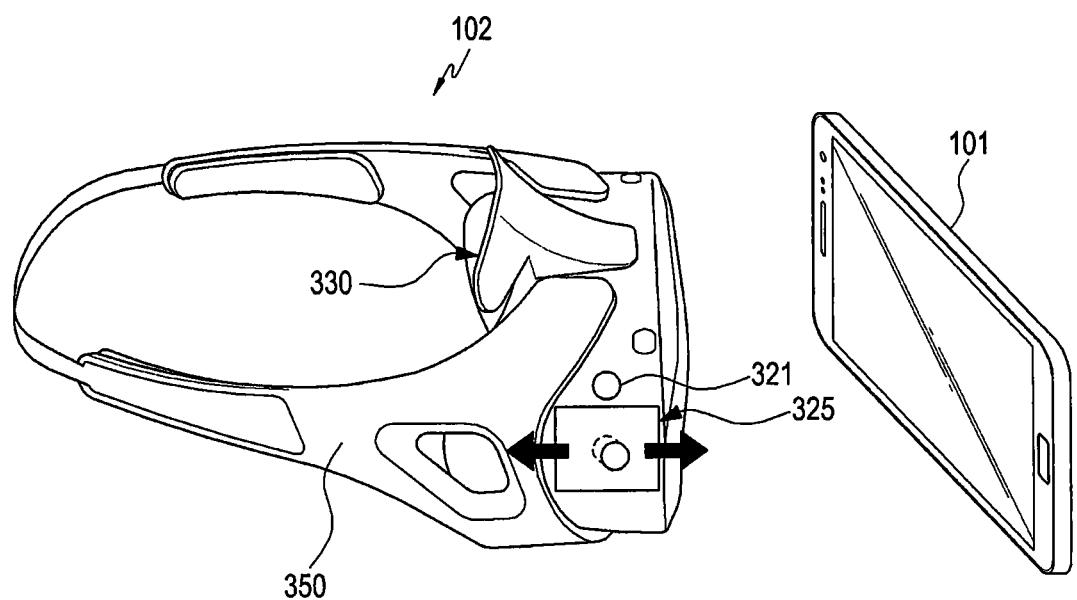
FIG. 3 is a diagram illustrating a perspective view of an electronic device and a relevant electronic device, according to an embodiment of the present invention.

FIG. 3 is a diagram illustrating a perspective view of a first electronic device and a second electronic device, according to an embodiment of the present invention.

The first electronic device 101 typically includes a display and stores a VR application. The VR application may provide a life-like display to the user. According to an embodiment of the present invention, the VR application may display an image for the left eye and an image for the right eye respectively corresponding to the user's eyes.

The first external electronic device 102 may be a HMT apparatus. The HMT apparatus may be worn on and fastened to the user's head. Further, the HMT apparatus may also fasten to the first electronic device 101 so that the user may observe an image displayed on the first electronic device 101.

According to an embodiment of the present invention, the first external electronic device 102 includes a housing 350 provided to be worn on the user's head, a shielding portion 330 provided at a region corresponding to the user's eyes, and at least one input button 321 provided at a region of the housing 350. The first external electronic device 102 includes an input pad 325 through which a swipe input may be received from the user.

The user may bring his eyes in tight contact with the shielding portion 330, allowing the user to observe an image by the VR application provided from the first electronic device 101 without interference from external light.

The first electronic device 101 may be integrated with the first external electronic device 102. The first electronic device 101 may be wiredly/wirelessly connected with the first external electronic device 102. For example, the first electronic device 101 may be connected with the first external electronic device 102 based on USB 4.0. It will be appreciated by one of ordinary skill in the art that any other connections that enable data communication between the electronic device 101 and the first external electronic device 102 may be used without limitation. According to an embodiment of the present invention, the first electronic device 101 may be physically coupled with the first external electronic device 102.

Figure 4:
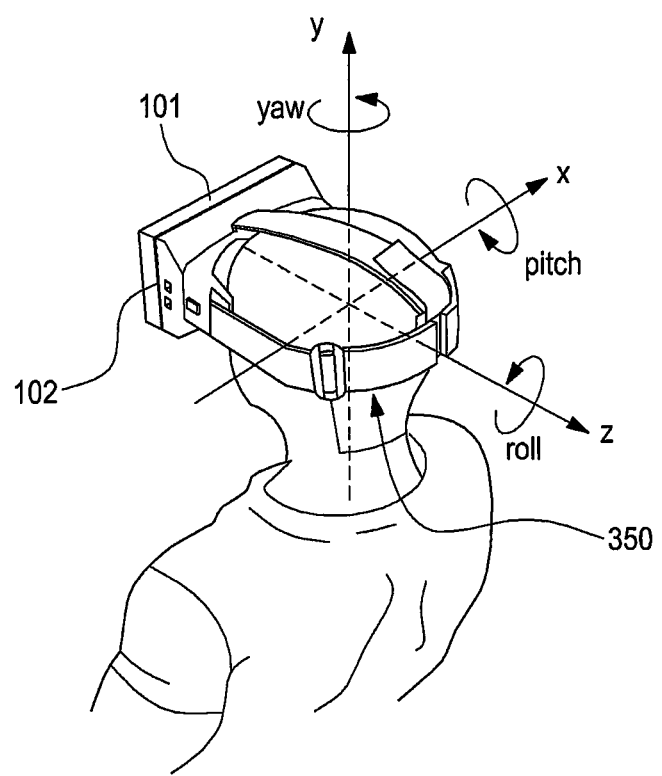
FIG. 4 is a diagram illustrating a perspective view of a user wearing an HMT apparatus, according to an embodiment of the present invention.

FIG. 4 is a diagram illustrating a perspective view in which a user wears an HMT apparatus, according to an embodiment of the present invention.

The user puts the housing 350 on his head. Further, the first electronic device 101 is coupled with the first external electronic device 102, and the user views images displayed on the display of the first electronic device 101.

The first electronic device 101 may display an image for a left eye and an image for a right eye on left and right portions, respectively, of the display. The image for the left eye may be incident upon the user's left eye, and the image for the right eye may be incident upon the user's right eye. The user may receive a VR service by observing the images incident upon his eyes.

The VR application executed on the first electronic device 101 may allow images for both eyes to be displayed on the display. Further, the VR application may vary and display the images for both eyes according to a motion (yaw, pitch, or roll) of the user or the first external electronic device 102.

The first external electronic device 102 may receive a command through at least one of the input button 321 and the input pad 325 from the user. Specifically, the user may input at least one of a distance adjustment command, a first threshold distance, and a second threshold distance through the input pad 325. Further, the first external electronic device 102 may output at least one of the input distance adjustment command, first threshold distance, and second threshold distance to the first electronic device 101. The first electronic device 101 may obtain at least one of the distance adjustment command, the first threshold distance, and the second threshold distance from the first external electronic device 102. According to an embodiment of the present invention, the user may directly input at least one of the distance adjustment command, the first threshold distance, and the second threshold distance to the first electronic device 101.

For example, the first electronic device 101 may display, on the display, a first object and a second object respectively corresponding to the left eye and the right eye, as described above. The first electronic device 101 may receive a distance adjustment command from the first external electronic device 102. The first electronic device 101 may adjust and display the distance between the first object and the second object based on the received distance adjustment command.

For example, when the user inputs a swipe gesture in a first direction of the input pad 325, the first electronic device 101 may increase and display the distance between the first object and the second object, corresponding to the same. Further, when the user inputs a swipe gesture in a second direction, which is in an opposite direction of the first direction, the first electronic device 101 may receive the swipe gesture from the second electronic device 102 and may reduce and display the distance between the first object and the second object.

Alternatively, the first external electronic device 102 may receive a first threshold distance. The first threshold distance means a minimum distance at which the left eye and right eye may form an image. The first threshold distance is described in greater detail below.

Figure 5:
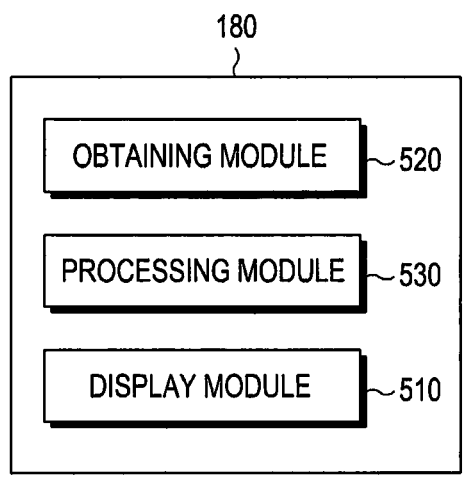
FIG. 5 is a block diagram illustrating a screen configuration module of an electronic device, according to an embodiment of the present invention.

FIG. 5 is a block diagram illustrating a screen configuration module of an electronic device, according to an embodiment of the present invention. Referring to FIG. 5, the screen configuration module 180 may include at least one of a display module 510, an obtaining module 520, and a processing module 530. The screen configuration module 180 may be provided separately from a processor (e.g., the processor 120) or may be fully or partially integrated with the processor.

According to an embodiment of the present invention, the display module 510 may display a screen of an application (i.e., an application screen) on the display (e.g., the display 160) of the first electronic device 101. The application may be, e.g., a VR application. For example, the display module 510 may display a first object and a second object on the display of the electronic device. Here, the first object may correspond to the user's left eye, and the second object may correspond to the user's right eye. The display module 510 may display the first object and the second object, with the first and second objects spaced apart from each other at a predetermined distance.

According to an embodiment of the present invention, the obtaining module 520 may obtain a first threshold distance between the first object and the second object. As described above, the first electronic device 101 may receive the first threshold distance input to the first external electronic device 102. Alternatively, the first electronic device 101 may directly receive the first threshold distance from the user. The obtaining module 520 may obtain the first threshold distance received through the above-described various methods.

According to an embodiment of the present invention, the processing module 530 may determine an IPD based on the first threshold distance. The processing module may read out a standard threshold distance and a standard IPD and may determine the IPD based on the obtained first threshold distance together with the standard threshold distance and standard IPD. The standard IPD may be an adult's median IPD. The standard threshold distance may be a threshold distance at the standard IPD. That is, the standard threshold distance may be a minimum distance between objects at which the user may form an image based on his eyes.

According to an embodiment of the present invention, the obtaining module 520 may obtain a distance adjustment command that enables adjustment of the distance between the first object and the second object. The processing module 530 may adjust the distance between the first object and the second object based on the obtained distance adjustment command. As described above, the distance adjustment command may be a swipe gesture in a first direction, according to an embodiment of the present invention.

The processing module 530 may reduce or increase the distance between the first object and the second object depending on the direction of the swipe gesture. Further, the processing 530 module may determine a degree of variation (a decrease or increase) of the distance between the first object and the second object depending on the size of the swipe gesture. The display module 510 may adjust and display the distance between the first object and the second object.

According to an embodiment of the present invention, the processing module 530 may set the size of each of the first object and the second object to a size readjusted by the VR application. The VR application may increase the size of each of the first object and the second object as the distance between the first object and the second object decreases. The processing module 530 may set the size increased by the VR application to the readjusted size. The resizing is described in greater detail below.

The display module 510 may display a VR object based on the determined IPD. For example, the VR application may update the preset IPD with the determined IPD, and when displaying the VR object in the future, may display the VR object based on the determined IPD.

According to an embodiment of the present invention, a grid-shaped reference object may be displayed around the first object and the second object. The reference object may be provided to allow the user to more easily identify a movement of the first object and the second object.

According to an embodiment of the present invention, the display module 510 may display two cross-shaped (+) objects respectively corresponding to the left eye and the right eye. The two cross-shaped (+) objects may be provided to allow the HMT apparatus to be properly worn, and are described in greater detail below.

According to an embodiment of the present invention, the obtaining module 520 may obtain a second threshold distance. The second threshold distance may be a maximum distance at which an image may be formed by the left and right eyes. The processing module 530 may determine an IPD based on the obtained second threshold distance.

According to an embodiment of the present invention, the display module 510 may perform control so that the determined IPD may be stored in association with user identification information. Information on the association between the IPD and the user identification information may be stored in at least one of the first electronic device 101, the first external electronic device 102, and the server 106.

According to an embodiment of the present invention, the display module 510 may provide a graphic user interface that includes the first object and the second object corresponding to the left eye and the right eye, respectively, and that enables adjustment of the distance between the first object and the second object.

According to an embodiment of the present invention, the obtaining module 520 may obtain a distance adjustment command. The display module 510 may adjust and display the distance between the first object and the second object based on the obtained distance adjustment command.

According to an embodiment of the present invention, the obtaining module 520 may obtain a first threshold distance that is a minimum distance at which an image may be formed by the left and right eyes, and the processing module 530 may determine an IPD based on the first threshold distance.

Figure 6:
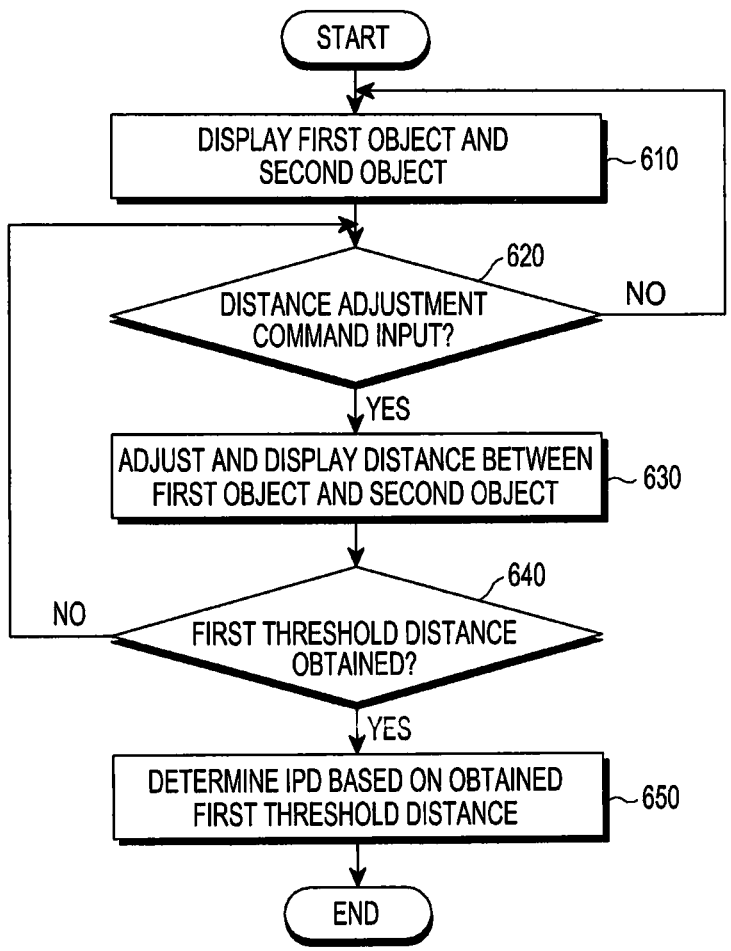
FIG. 6 is a flowchart illustrating a screen configuration method, according to an embodiment of the present invention.

FIG. 6 is a flowchart illustrating a screen configuration method, according to an embodiment of the present invention. The method for configuring a screen as shown in FIG. 6 is described in greater detail with reference to FIGS. 7 to 12.

Figure 7:
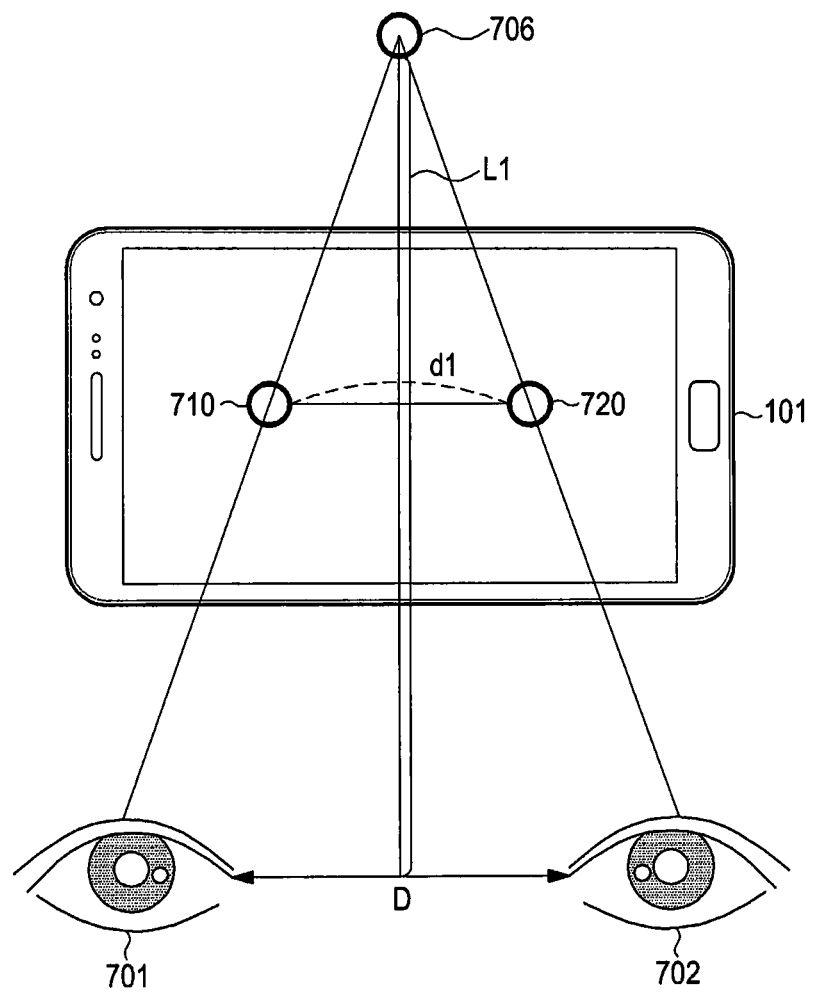
FIG. 7 is a diagram illustrating a display of an electronic device, according to an embodiment of the present invention.

In step 610, the electronic device (e.g., the first electronic device 101) displays a first object 710 and a second object 720 on a first region and a second region, respectively, of the display, as shown in FIG. 7. The first object 710 corresponds to the left eye 701, and the second object 720 corresponds to the right eye 702. As shown in FIG. 7, the IPD, which is a distance between the left eye 701 and the right eye 702, is D.

The electronic device displays the first object 710 and the second object 720, with the first object 710 and the second object 720 spaced apart from each other at a predetermined distance. The user views an object image 706 at a point where a straight line passing through the left eye 701 and the first object 710 crosses a straight line passing through the right eye 702 and the second object 720. For example, the user may view the object image as being present at a point that is positioned away from the user by L1.

Figure 8:
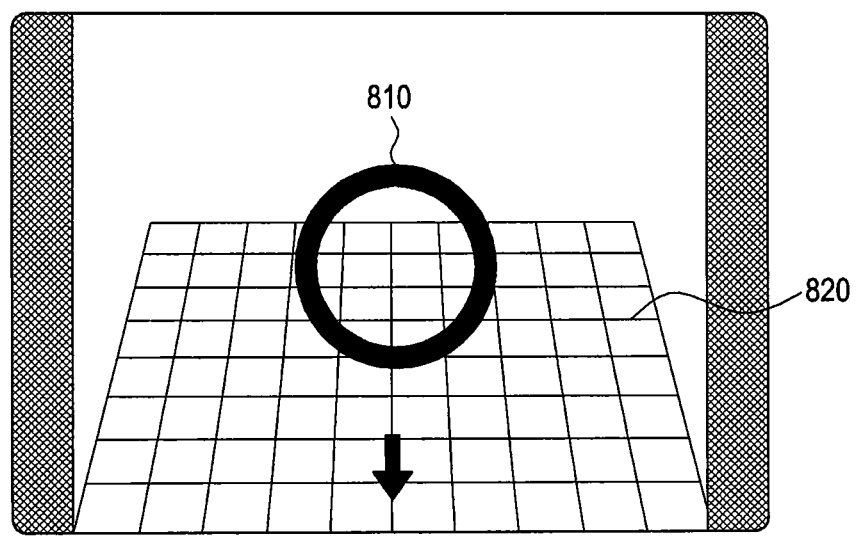
FIG. 8 is a diagram illustrating an object image recognized by a user observing the electronic device of FIG. 7, according to an embodiment of the present invention.

The electronic device may also display a grid-shaped reference object, as shown in FIG. 8. The reference object may allow the user to more readily identify a movement of the object.

According to an embodiment of the present invention, the electronic device may display the first object 710 and second object 720 shaped as circles. As will be described in greater detail below, this allows a user to more clearly determine whether the first object 710 overlaps the second object 720.

FIG. 8 is a diagram illustrating an image observed from the user's position, according to an embodiment of the present invention.

As shown in FIG. 8, the user may observe images as if an object image 810 floats over a reference object image 820. The object image 810 may be shaped as a single circle, not two circles. Specifically, the eyes 701 and 702 may form an image (i.e., the object image 810) for the two objects 710 and 720 that are spaced apart from each other at d1. The object image 810 may be observed as having a first size. The image shown in FIG. 8 illustrates a case in which the first electronic device 101 also displays the reference object, as described above.

Referring back to FIG. 6, the electronic device determines whether a distance adjustment command is input, in step 620. The distance adjustment command may be a command for decreasing or increasing the distance between the two objects 710 and 720. For example, the user may input the distance adjustment command by inputting a swipe gesture to the input pad 325.

When a distance adjustment command is input, the electronic device adjusts and displays the distance between the first object 710 and the second object 720 corresponding to the distance adjustment command, in step 630. Specifically, when the distance adjustment command is input, the electronic device may analyze the distance adjustment command to determine whether to decrease or increase the distance between the two objects 710 and 720 and a degree of the decrease or increase.

Figure 9:
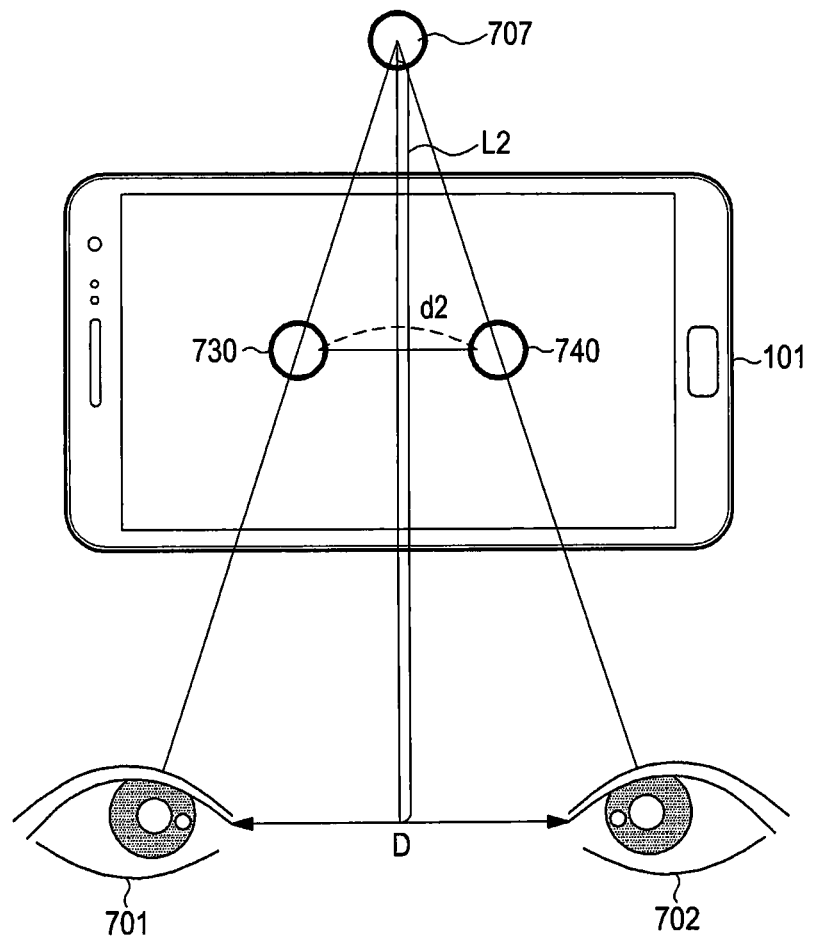
FIG. 9 is a diagram illustrating a display of an electronic device, according to an embodiment of the present invention.

The electronic device displays two objects 730 and 740 based on the determined information, as shown in FIG. 9. In the embodiment of the present invention described in connection with FIG. 9, it is assumed that the distance adjustment command reduces the distance between the two objects 710 and 720.

The electronic device displays the first object 730 and the second object 740 spaced apart from each other at d2. Here, d2 is smaller than d1. Further, d2 is assumed to be the first threshold distance. Specifically, it is assumed that the user's eyes may form an image for the first object 730 and the second object 740 that are spaced apart at d2 but cannot form an image for two objects that are spaced apart at a distance smaller than d2.

The electronic device may display the first object 730 to be larger than the first object 710. Further, the electronic device may display the second object 740 to be larger than the second object 720. An image 707 formed by the first object 730 and the second object 740 is positioned closer to the user than the image 706 formed by the first object 710 and the second object 720, and objects positioned closer are observed by the user to be larger. The VR application may perform the above-described resizing as the distance between the first object 730 and the second object 740 becomes smaller than the previous distance.

Alternatively, the electronic device may keep the size of the first object 730 and the second object 740 equal to the previous size. This prevents the user from being confused in light of an IPD measurement process, as described in greater detail below.

The user may determine that the object image 707 is present at a point where a straight line passing through the left eye 701 and the first object 730 crosses a straight line passing through the right eye 702 and the second object 740. For example, the user may view the object image 707 as being present at a point that is positioned away from the user at L2. L2 is smaller than L1. Specifically, the user observes the object image as if the object image is present closer to the user than earlier. As the distance between the first object 730 and the second object 740 is further reduced, the user may observe the first object 730 and the second object 740 by further focusing with respect to the pupils of the eyes.

Figure 10:
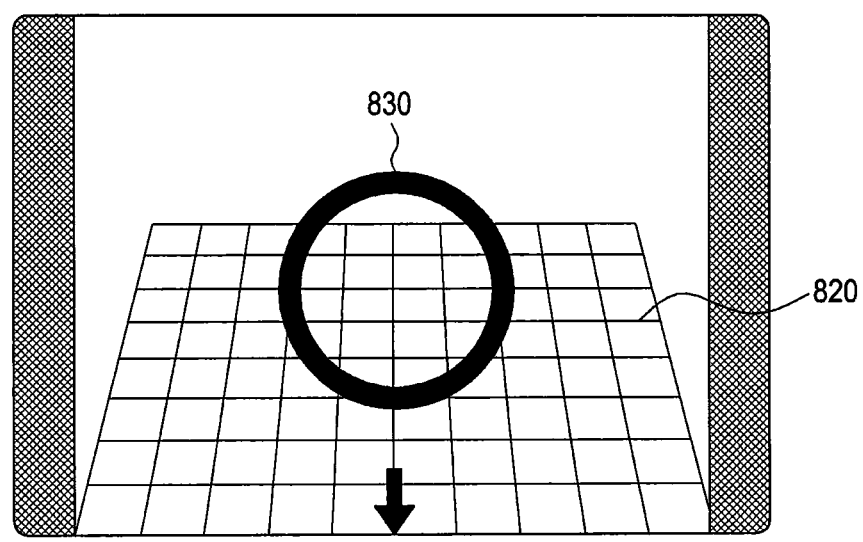
FIG. 10 is a diagram illustrating an object image recognized by a user observing the electronic device of FIG. 9, according to an embodiment of the present invention.

FIG. 10 is a diagram illustrating an image observed from the user's position, according to an embodiment of the present invention.

As shown in FIG. 10, the user observes images as if an object image 830 floats over a reference object image 820. The object image 830 is shaped as a single circle, not two circles. In other words, the eyes 701 and 702 form an image (i.e., the object image 830) for the two objects 730 and 740 that are spaced apart from each other at d1.

The object image 830 is observed as being present closer to the user as compared with the object image 810. Further, the object image 830 is larger in size than the object image 810. Since the object image 830 is present closer than the object image 810 from the user's position, the object image 830 being observed to be larger than the object image 810 is consistent with the real life. Accordingly, as described above, the VR application may display the objects 730 and 740 to be larger than the previous objects 710 and 720.

As described above, the electronic device may resize the objects 730 and 740 by the VR application. For example, the electronic device may resize the objects 730 and 740 so that the size of the object image 830 by the objects 730 and 740 is observed as having the same size as the previous object image 810.

The user may more clearly identify a movement of the object images 810 and 830 by the reference object image 820.

According to an embodiment of the present invention, the electronic device may display a message instructing to move the objects until the images are observed to overlap each other. The user may additionally input a distance adjustment command corresponding to the same. Specifically, the user may repeatedly input distance adjustment commands until the first threshold distance is obtained in step 640. According to an embodiment of the present invention, although d2 is the first threshold distance, the user might not initially recognize d2 as the first threshold distance, and thus, may input an additional distance adjustment command.

Figure 11:
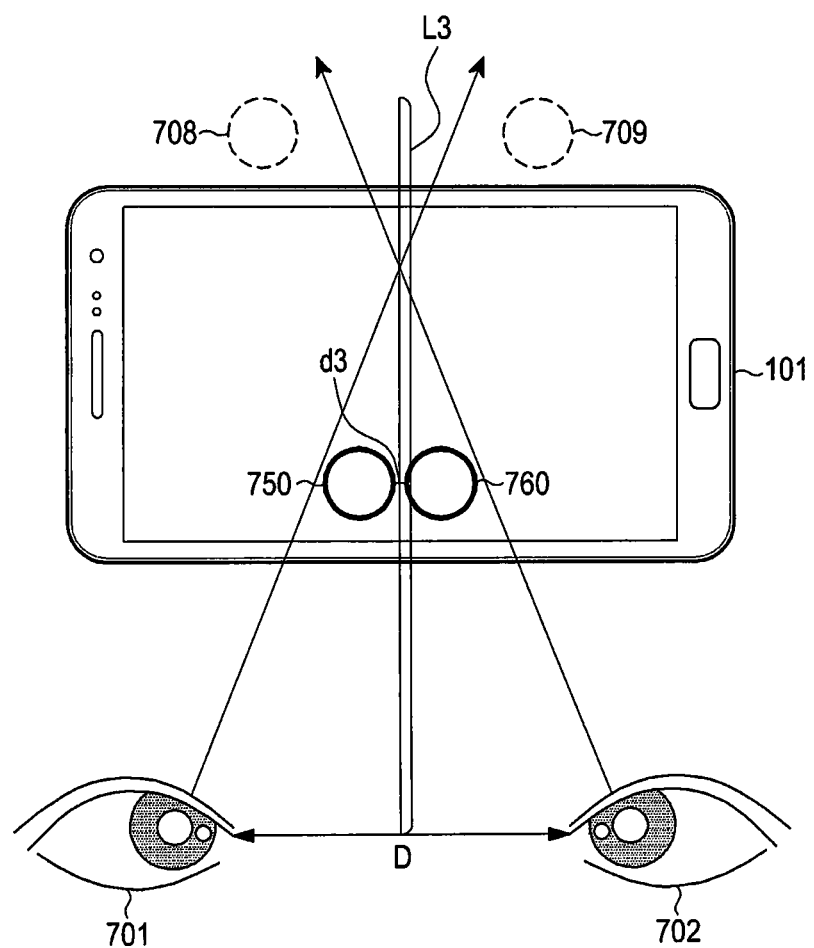
FIG. 11 is a diagram illustrating a display of an electronic device, according to an embodiment of the present invention.

FIG. 11 is a diagram illustrating an example where two objects are spaced apart from each other at a distance less than the first threshold distance, according to an embodiment of the present invention.

As described above, even when the two objects 730 and 740 reach the first threshold distance as shown in FIGS. 9 and 10, the user may input an additional distance adjustment command.

As shown in FIG. 11, the electronic device may readjust the distance between two objects 750 and 760 to d3 based on an additional distance adjustment command.

The electronic device may display the first object 750 and the second object 760 spaced apart from each other at d3. Here, d3 is smaller than d2. Specifically, it is assumed that d2 is the first threshold distance and that the user's eyes may form an image for the first object 730 and the second object 740 that are spaced apart at d2 but cannot form an image for two objects 750 and 760 that are spaced apart at a distance smaller than d2.

The electronic device displays the first object 750 as being larger than the first object 730. Further, the electronic device displays the second object 760 as being larger than the second object 740. Alternatively, the electronic device may keep the size of the first object 750 and the second object 760 equal to the previous size.

The user may attempt to observe an object image 708, 709 at a point where a straight line passing through the left eye 701 and the first object 750 crosses a straight line passing through the right eye 702 and the second object 760. For example, the user may attempt to observe the object image 708, 709 at a point away from the user at L3. L3 is smaller than L2. As the distance between the first object 750 and the second object 760 is further reduced as compared with earlier, the user may attempt to observe one object image by further focusing with respect to the pupils of the eyes. However, the user's eyes might not form one object image for the objects that are spaced apart from each other at L3.

Figure 12:
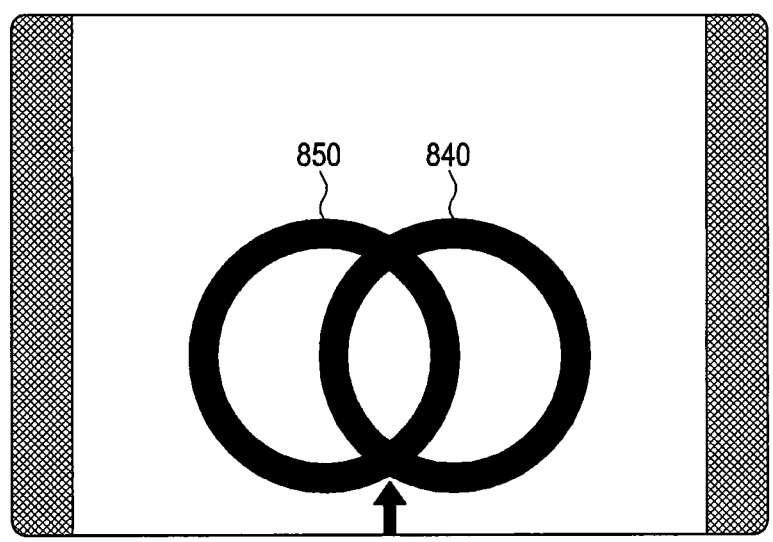
FIG. 12 is a diagram illustrating an object image recognized by a user observing the electronic device of FIG. 11, according to an embodiment of the present invention.

FIG. 12 is a diagram illustrating an image observed from the user's position, according to an embodiment of the present invention.

As shown in FIG. 12, the user may observe images as two object images 840 and 850. The object image 840 is the one obtained by observing the first object 750 by the left eye 701, and the object image 850 is the one obtained by observing the second object 760 by the right eye 702.

The object images 840 and 850 may be observed as being closer to the user as compared with the object image 830. Further, the object images 840 and 850 may be larger in size than the object image 830.

Accordingly, the user may recognize that the distance d3 between the two objects 750 and 760 is less than the first threshold distance as the eyes identify that there are two object images for the two objects 750 and 760.

When two object images are observed, the electronic device may display a message intended to reduce the distance between the two objects or to move the observed object image away from the user.

The user may input a distance adjustment command to the electronic device. As an example, the user may input the distance adjustment command by inputting a swipe gesture to the input pad 325. When a swipe gesture in a first direction is a distance adjustment command to reduce the distance between the two objects, the user may input a distance adjustment command of a swipe gesture in a second direction that is an opposite direction of the first direction.

The electronic device may adjust and display the distance between the two objects 750 and 760 based on the input distance adjustment command. The electronic device may identify that the input distance adjustment command is the swipe gesture in the second direction and may thus adjust and display the distance between the two objects 750 and 760 to be further reduced than earlier.

The user may input distance adjustment commands for increasing the distance between the two objects until the object images formed by the eyes for the two objects turn back to one object image. The user may input distance adjustment commands until the distance between the two objects becomes d2, for example. When the distance between the two objects becomes d2, the eyes may recognize that one object image is formed for the two objects, the user may input distance adjustment commands until the distance between the two objects becomes d2.

The user may input the first threshold distance when the distance between the two objects becomes d2 to allow the user to observe one object image. For example, the user may input the first threshold distance or a command indicating that one object image has been observed by inputting a predetermined command through the input button 321 or the input pad 325. The first electronic device 101 may receive the first threshold distance from the second electronic device 102.

Alternatively, the user may directly input the first threshold distance to the first electronic device 101.

Referring back to FIG. 6, in step 640 the electronic device determines whether the first threshold distance has been obtained. When the first threshold distance has not been obtained, the electronic device returns to step 620 to determine whether a distance adjustment command is input. When the first threshold distance has been obtained, the electronic device determines an IPD based on the obtained first threshold distance, in step 650.

Figure 13:
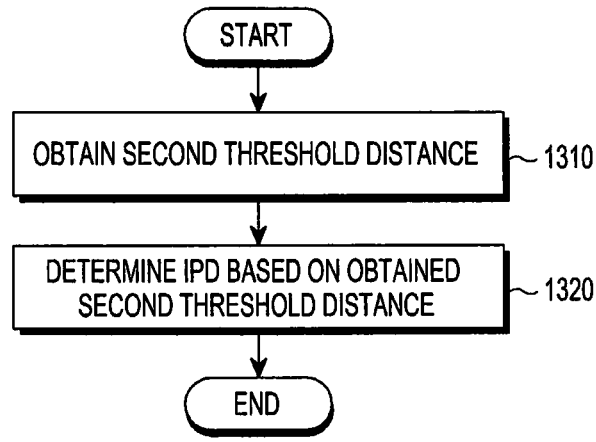
FIGS. 13 and 14 are flowcharts illustrating methods for determining an IPD, according to embodiments of the present invention.

FIG. 13 is a flowchart illustrating a method for determining an IPD, according to an embodiment of the present invention.

In step 1310, the electronic device obtains a second threshold distance. The second threshold distance may be a maximum distance between objects at which one object image may be formed by both eyes.

The electronic device may display the first object and the second object spaced apart from each other. The user's left eye may observe the first object, and the user's right eye may observe the second object. Meanwhile, when the distance between the first object and the second object exceeds the second threshold distance, the user's eyes might not form one object image for the first object and the second object.

The user may recognize the second threshold distance by inputting a distance adjustment command in a similar way to those described in connection with FIGS. 7 and 12, and the user may input the recognized second threshold distance to the electronic device or HMT apparatus.

In step 1320, the electronic device determines an IPD based on the obtained second threshold distance. The electronic device may determine an IPD based on the second threshold distance, a standard IPD, and a standard maximum threshold distance. The standard IPD may be an adult's median IPD. The standard maximum threshold distance may be the second threshold distance at the standard IPD. That is, the standard threshold distance may be a maximum distance between objects at which the user may form an image based on his eyes.

As described above, the electronic device may determine an IPD based on the minimum or maximum distance between objects at which an image may be formed by both eyes. Or, the electronic device may determine an IPD based on both the minimum distance and the maximum distance.

Figure 14:
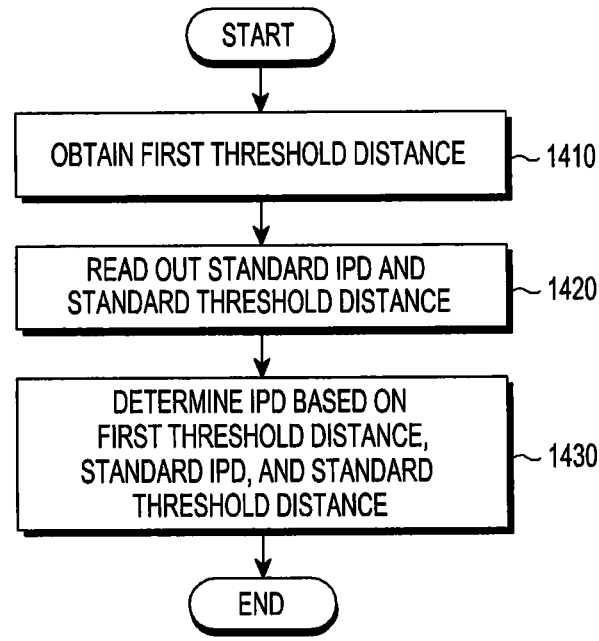

FIG. 14 is a flowchart illustrating a method for determining an IPD, according to an embodiment of the present invention.

In step 1410, the electronic device obtains a first threshold distance. As described above, the electronic device may obtain the first threshold distance based on a direct input to the electronic device or an input from the HMT apparatus.

In step 1420, the electronic device reads out a standard IPD and a standard threshold distance. The standard IPD may be an adult's median IPD. The standard threshold distance may be a threshold distance at the standard IPD. That is, the standard threshold distance may be a minimum distance between objects at which the user may form an image based on his eyes.

In step 1430, the electronic device may determine an IPD based on the first threshold distance, the standard IPD, and the standard threshold distance.

For example, the IPD may be determined based on Equation (1) below.

$$IPD = \frac{\text{first threshold distance}}{\text{standard threshold distance}} \times \text{standard } IPD \quad (1)$$

The electronic device may determine an IPD from the first threshold distance based on Equation (1), for example. However, Equation (1) is merely an example, and it should be appreciated by one of ordinary skill in the art that the electronic device may determine an IPD from the first threshold distance in various manners. Further, it may be appreciated by one of ordinary skill in the art that when the electronic device uses the second threshold distance, Equation (2) may be used to determine the IPD, as set forth below.

$$IPD = \frac{\text{second threshold distance}}{\text{standard maximum threshold distance}} \times \text{standard } IPD \quad (2)$$

Figure 15:
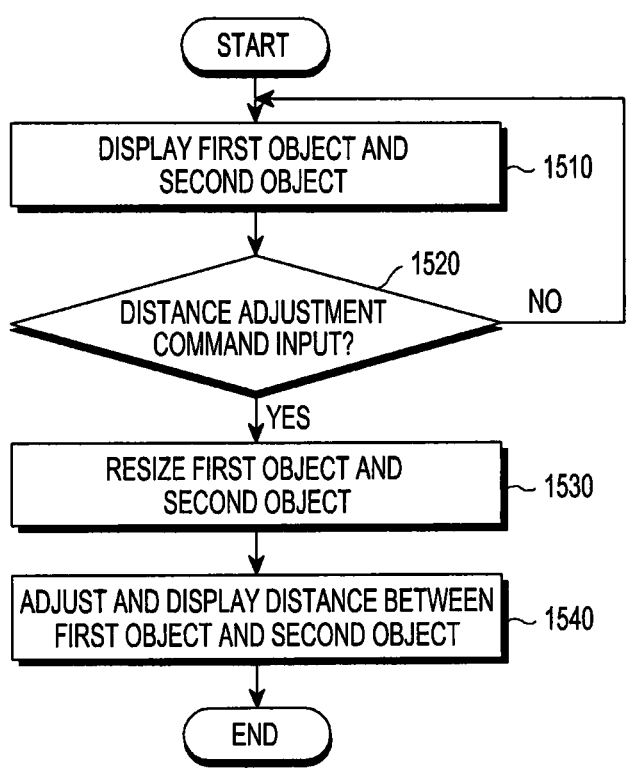
FIG. 15 is a flowchart illustrating a screen configuration method, according to an embodiment of the present invention.

FIG. 15 is a flowchart illustrating a screen configuration method, according to an embodiment of the present invention. The method for configuring a screen shown in FIG. 15 is described in further detail with reference to FIGS. 16A-C.

Figure 16A:
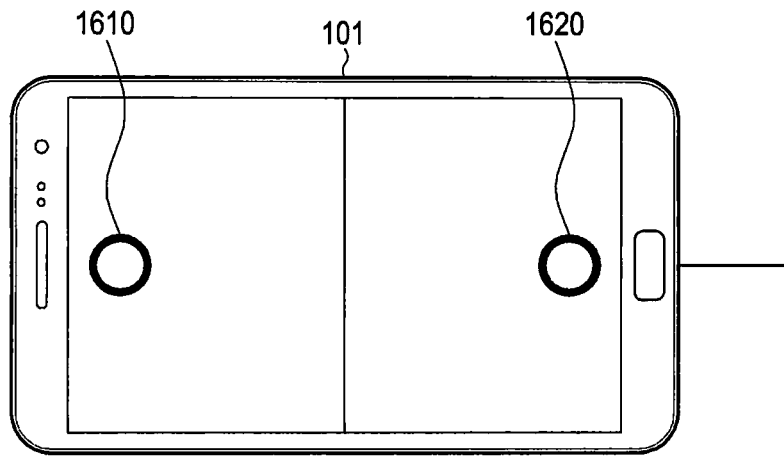
FIGS. 16A-C are diagrams illustrating an object of a VR application and a resized object, according to an embodiment of the present invention.

In step 1510, as shown in FIG. 16A, the first electronic device 101 displays a first object 1610 and a second object 1620 on the display. The first object 1610 and the second object 1620 may be respective, at least, portions of images respectively corresponding to the left eye and the right eye.

The first electronic device 101 may store a VR application. The first electronic device 101 may display the first object 1610 and the second object 1620 using the VR application. The VR application may provide an image for left eye and an image for right eye to a first region and a second region, respectively, of the first electronic device 101 so that the user may observe an image that is consistent with real-life.

In step 1520, the electronic device determines whether a distance adjustment command is input. When the distance adjustment command is input, the first electronic device 101 adjusts the size of the first object 1610 and the second object 1620, in step 1530.

Figure 16B:
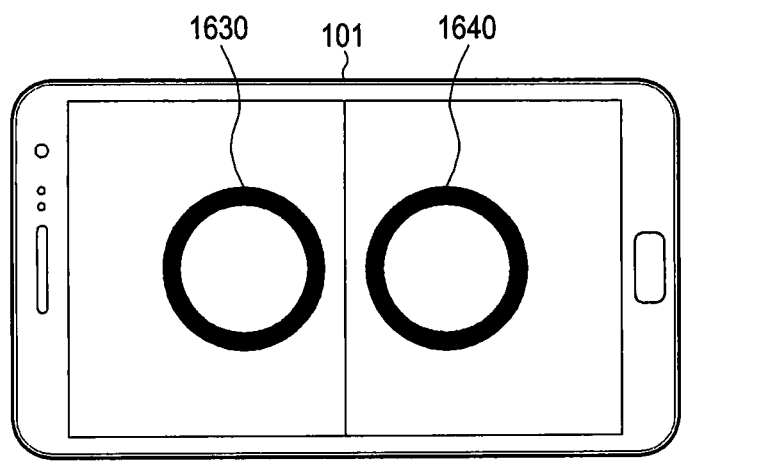

The VR application, as shown in FIG. 16B, displays a first object 1630 and a second object 1640 to be viewed closer than earlier, corresponding to the distance adjustment command. Further, the VR application may set the size of the first object 1630 to be larger than the size of the first object 1610 and may set the size of the second object 1640 to be larger than the second object 1620.

Accordingly, the object image of the two objects is recognized as being closer to the user than earlier, and thus, the VR application increases the size of the two objects to match real-life.

Figure 16C:
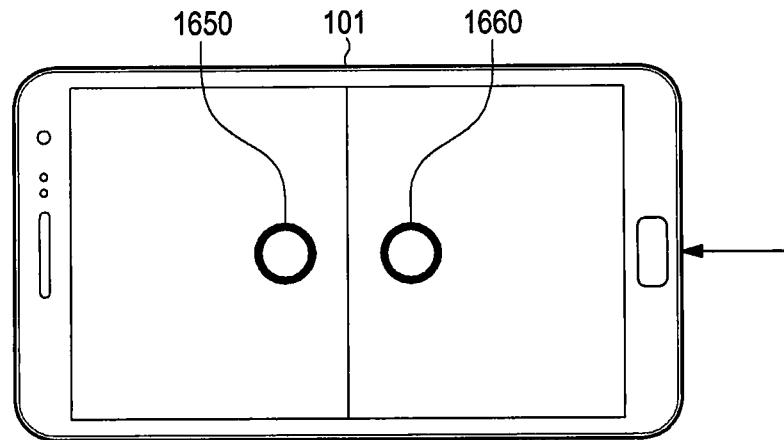

Alternatively, the electronic device may readjust the size set by the VR application. For example, as shown in FIG. 16C, the electronic device may display objects 1650 and 1660 that are smaller in size than the objects 1630 and 1640 by the VR application. The size of the objects 1650 and 1660 may be larger than or equal to the size of the objects 1610 and 1620.

This allows the user to more clearly observe whether one object image is viewed or two object images are viewed. Specifically, since the user should observe two object images viewed when the object images having the same size go beyond a particular position as they are relocated, it may be preferable that the object images remain at a constant size while moved.

Referring back to FIG. 15, in step 1540, the first electronic device 101 adjusts and displays the distance between the first object and the second object.

Figure 17:
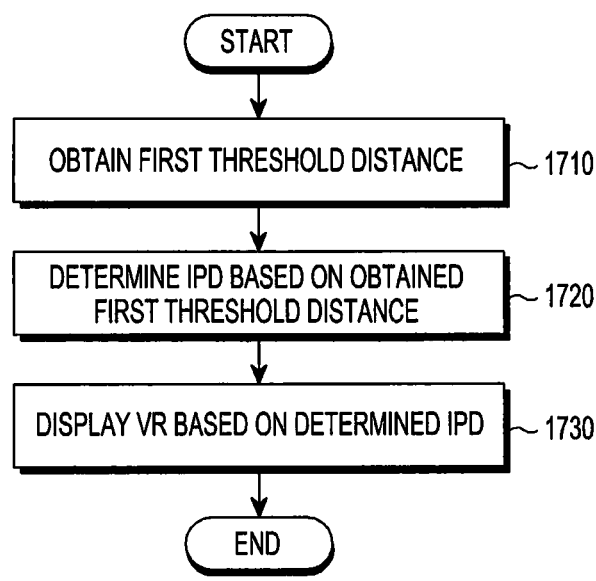
FIG. 17 is a flowchart illustrating an IPD calibration process, according to an embodiment of the present invention.

FIG. 17 is a flowchart illustrating an IPD calibration process, according to an embodiment of the present invention.

In step 1710, the electronic device obtains a first threshold distance. The electronic device may directly obtain the first threshold distance or may obtain the first threshold distance by receiving the first threshold distance from an HMT apparatus.

In step 1720, the electronic device determines an IPD based on the first threshold distance. According to an embodiment of the present invention, the electronic device may determine an IPD based on a standard threshold distance, a standard IPD, and the first threshold distance.

In step 1730, the electronic device displays a VR object based on the determined IPD. For example, the electronic device may reconfigure at least one of the position and size of the VR object provided by the VR application and may display the reconfigured VR object. Alternatively, the electronic device may update the stored IPD of the VR application, and the VR application may provide the VR object based on the updated IPD. Specifically, as described above, the electronic device may perform IPD calibration separately from the VR application, or an IPD calibration process may be included in the VR application.

Figure 18:
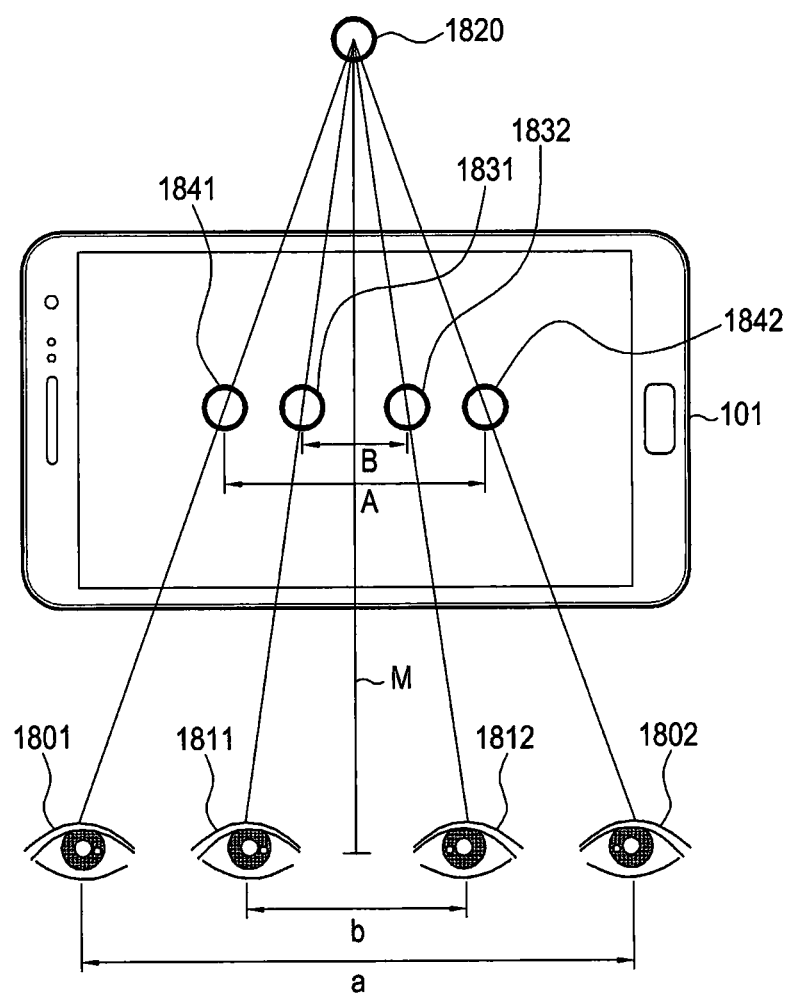
FIG. 18 is a diagram illustrating an IPD calibration process, according to an embodiment of the present invention.

FIG. 18 is a diagram illustrating an IPD calibration process, according to an embodiment of the present invention.

In the embodiment described with reference to FIG. 18, it is assumed that a left eye 1801 and a right eye 1802 are spaced apart from each other at 'a'. Here, 'a' is an IPD that may be determined, at least in part, by the first electronic device 101, as described above.

The first electronic device 101 may store a VR application programmed to provide virtual objects 1831 and 1832, with the virtual objects 1831 and 1832 spaced apart from each other at B while a predetermined IPD, e.g., a reference IPD by which the distance between a reference left eye 1811 and a reference right eye 1812 is 'b', is set. Specifically, the VR application may display the virtual objects 1831 and 1832 spaced apart from each other at B so that an object image 1820 is observed at a position that is M away from the user. This may be a result of computation conducted as the VR application considers the user whose IPD is b.

When the first electronic device 101 obtains the user's actual IPD as being 'a', the first electronic device 101 may display virtual objects 1841 and 1842 spaced apart from each other at A so that the user may observe the object image 1820.

As described above, the first electronic device 101 may offer a VR object corresponding to an IPD to each of users having various IPDs.

Figure 19:
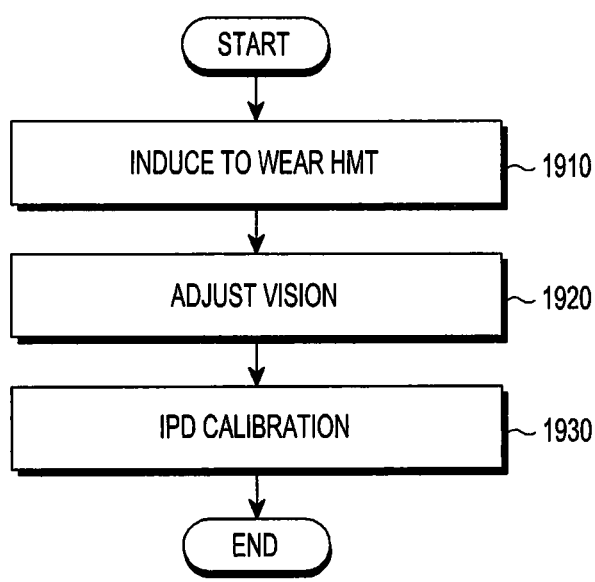
FIG. 19 is a flowchart illustrating a method for setting a VR application, according to an embodiment of the present invention.

FIG. 19 is a flowchart illustrating a method for setting a VR application, according to an embodiment of the present invention.

In step 1910, the electronic device induces an HMT apparatus to be properly worn. An operation of the electronic device for properly wearing the HMT apparatus is described in greater detail with reference to FIGS. 20 and 21.

Figure 20:
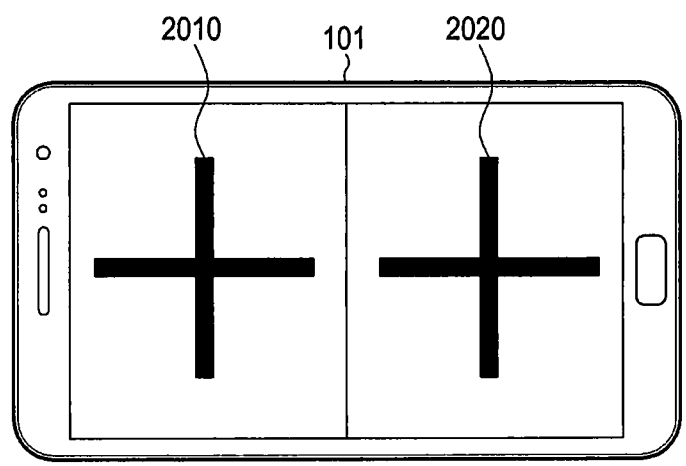
FIG. 20 is a diagram illustrating operation of an electronic device that allows an HMT apparatus to be properly worn, according to an embodiment of the present invention.

As shown in FIG. 20, the first electronic device 101 displays two cross-shaped (+) objects 2010 and 2020 on a first region and a second region, respectively, of the display. The cross may have a shape in which two lines perpendicularly cross each other.

The first object 2010 may correspond to the user's left eye, and the second object 2020 may correspond to the user's right eye. An object image formed by the first object 2010 and the second object 2020 may be observed as shown in FIG. 21, for example.

Figure 21:
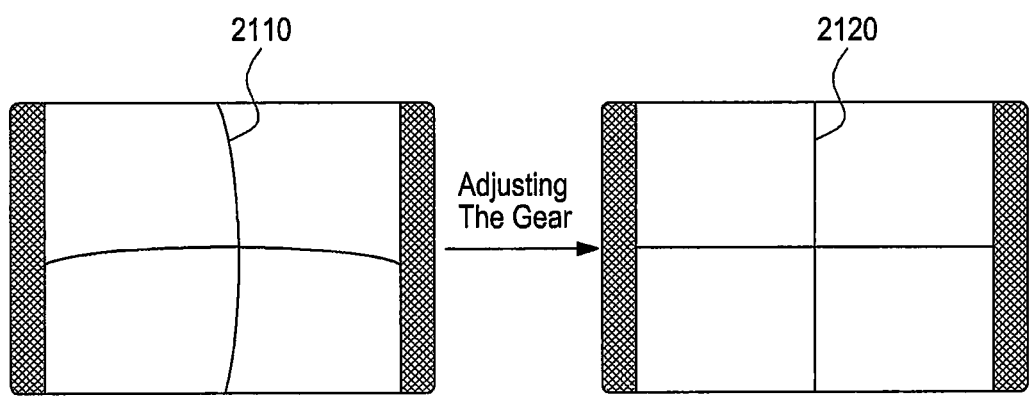
FIG. 21 is a diagram illustrating an object image recognized by a user observing the electronic device of FIG. 20, according to an embodiment of the present invention.

When the user fails to observe the first electronic device 101 at a correct angle due to improper wearing of the HMT apparatus, an object image 2110 that is not a straight line but a curved line as shown on the left side of FIG. 21 may be observed.

When the user properly wears the HMT apparatus, and thus, observes the first electronic device 101 at a correct angle, an object image 2120 that is a straight line, as shown on the right side of FIG. 21, may be observed.

The first electronic device 101 may further display a message for inducing the HMT apparatus to be properly worn, which directs the HMT apparatus to be worn so that the object image is viewed as a straight line, for example.

According to an embodiment of the present invention, the first electronic device 101 may display the first object 2010 and the second object 2020, with the first object 2010 and the second object 2020 remaining at a constant size. The VR application may be programmed to vary the size and position of the first object 2010 and the second object 2020 and display the varied first object 2010 and second object 2020 based on the user's motion.

However, in the process of determining whether the user properly wears the HMT apparatus, when the objects 2010 and 2020 are arranged at the same position and have the same size, the user may make a correct determination.

Accordingly, the first electronic device 101 may display the first object 2010 and the second object 2020 at a predetermined position and with a predetermined size regardless of the position and size of the objects by the VR application.

Meanwhile, the cross-shaped (+) objects 2010 and 2020 are merely an example, and it may be appreciated by one of ordinary skill in the art that there are no limitations on the objects as long as the objects make it possible to determine whether the user properly wears the HMT apparatus.

Referring back to FIG. 19, in step 1920, the electronic device displays a graphic user interface for adjusting the user's vision.

In step 1930, the electronic device may perform an IPD calibration process, as described above.

Figure 22:
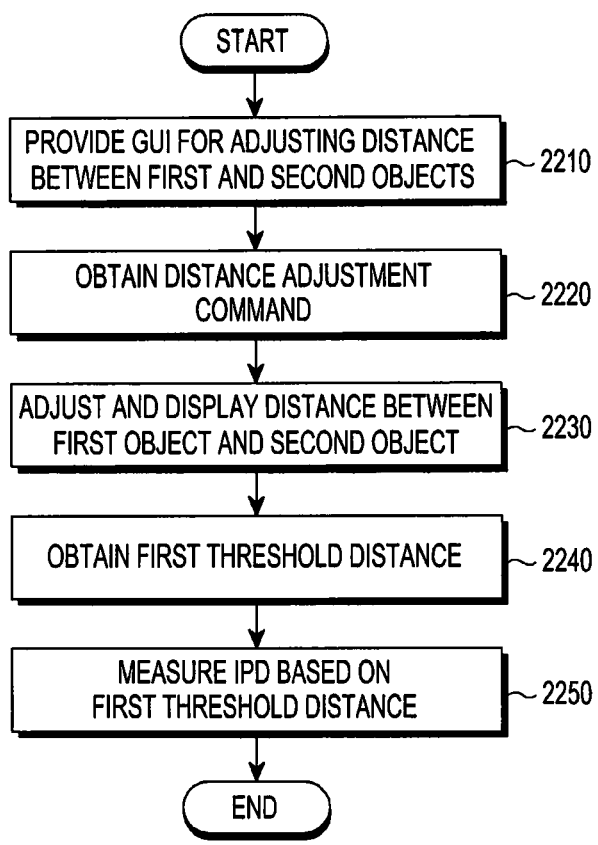
FIG. 22 is a flowchart illustrating a screen configuration method, according to an embodiment of the present invention.

FIG. 22 is a flowchart illustrating a screen configuration method, according to an embodiment of the present invention.

In step 2210, the electronic device provides a graphic user interface that includes a first object and a second object and that enables adjustment of the distance between the first object and the second object. The first object and the second object may correspond to the user's left eye and right eye, respectively.

In step 2220, the electronic device obtains a distance adjustment command for adjusting the distance between the first object and the second object. The electronic device may obtain the distance adjustment command directly from the user or via relaying of another electronic device (e.g., the first external electronic device 102 (the HMT apparatus)).

In step 2230, the electronic device adjusts and displays the distance between the first object and the second object based on the obtained distance adjustment command. For example, the electronic device may determine whether to decrease/increase the distance or a degree of distance adjustment based on the distance adjustment command. The electronic device may adjust and display the distance between the first object and the second object based on a result of the determination.

In step 2240, the electronic device obtains a first threshold distance. The first threshold distance may be a minimum distance at which the user's eyes may form an image for the first and second objects. The electronic device may obtain the first threshold distance directly from the user or through relaying of another electronic device (e.g., the first external electronic device 102 (the HMT apparatus)).

In step 2250, the electronic device determines an IPD based on the first threshold distance. For example, the electronic device may determine an IPD based on the first threshold distance, a standard threshold distance, and a standard IPD.

Alternatively, the electronic device may obtain a second threshold distance and may determine an IPD based on the obtained second threshold distance. The second threshold distance may be a maximum distance at which the user's eyes may form an image for the first and second objects.

Figure 23:
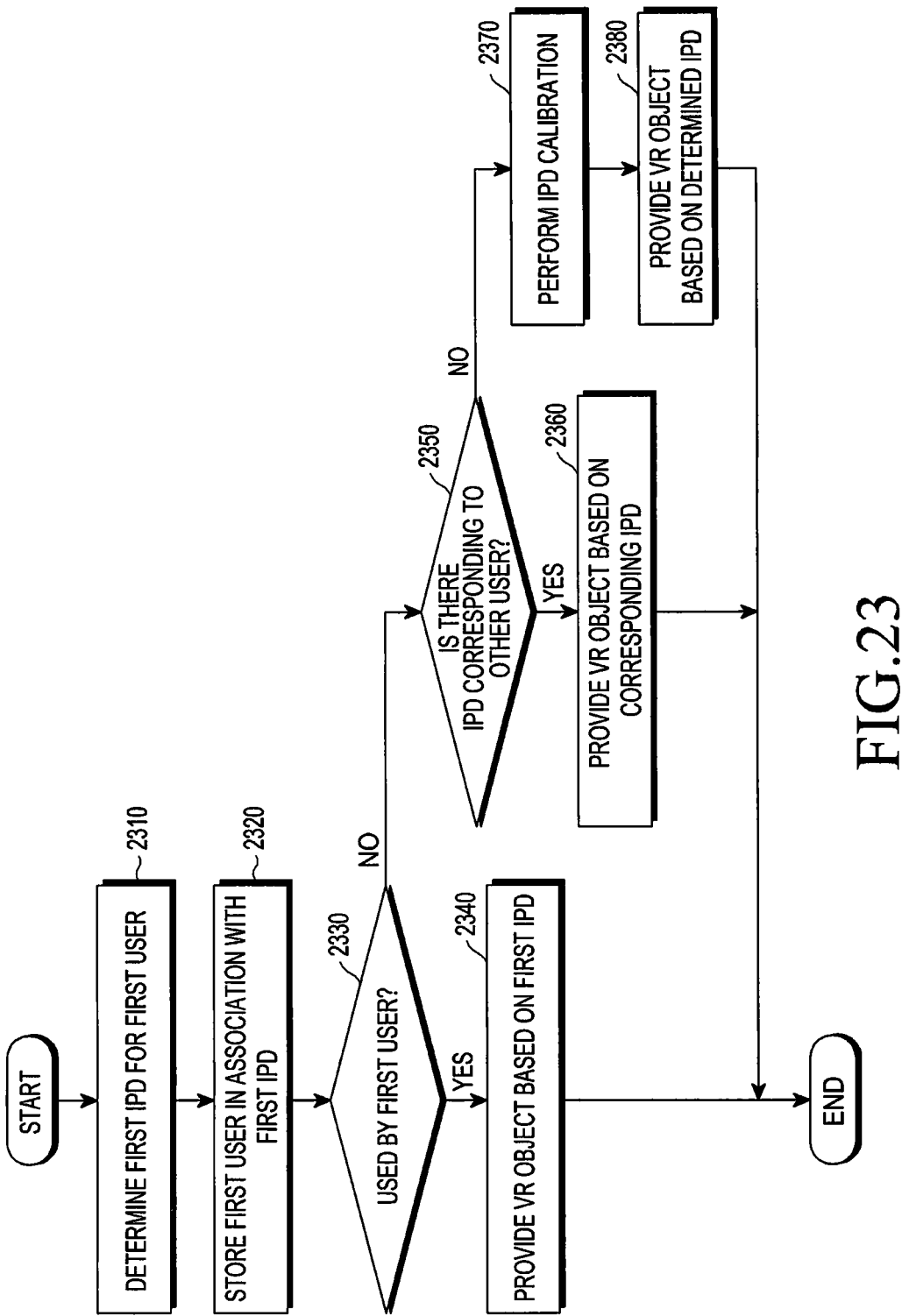
FIG. 23 is a flowchart illustrating a screen configuration method, according to an embodiment of the present invention.

FIG. 23 is a flowchart illustrating a screen configuration method, according to an embodiment of the present invention.

In step 2310, the electronic device determines a first IPD for a first user. The process in which the electronic device determines the first IPD is described in detail above.

In step 2320, the electronic device stores first identification information for the first user in association with the first IPD. For example, the electronic device may store Table 1 as shown below.

TABLE 1

| User ID | IPD |
|---|---|
| First user | p |
| Second user | q |
| Third user | r |

The user-IPD relationship, as shown in Table 1, may be stored in the electronic device. Alternatively, the user-IPD relationship, as shown in Table 1, may be stored in a server that may communicate with the electronic device. That is, the server may manage per-user IPDs. When per-user IPD information is managed by the server, the electronic device may transmit user identification information, and the server may transmit an IPD corresponding to the user identification information to the electronic device.

In step 2330, the electronic device determines whether the first user uses the electronic device. For example, the electronic device may perform a predetermined user identification process and may determine whether the first user uses the electronic device based on a result of the identification.

When it is determined that the first user uses the electronic device, a VR object may be provided based on a corresponding first IPD (p). Accordingly, once the first user performs an initial calibration process, it is not necessary for the first user to perform additional calibration processes upon subsequent use of the VR application.

When it is determined that the first user is not the user of the electronic device, the electronic device determines whether there is an IPD corresponding to the user of the electronic device, in step 2350.

The electronic device may determine whether there is an IPD corresponding to a second user using, e.g., Table 1. When it is determined that there is a corresponding IPD, the electronic device provides a VR object based on the corresponding IPD, e.g., an IPD of q corresponding to the second user, in step 2360.

When it is determined that there is no corresponding IPD, the electronic device conducts IPD calibration, in operation 2370. Specifically, the electronic device may conduct an IPD calibration process of providing a GUI including the first object and the second object, enabling adjustment of the distance between the first object and the second object, and obtaining a first threshold distance or a second threshold distance to determine an IPD.

In step 2380, the electronic device provides a VR object based on the IPD determined in the IPD calibration process.

As described above, the user may conduct a first IPD calibration process once and may subsequently receive VR services corresponding to IPDs. In particular, when the user identification information-IPD relationships are managed by the server as well as the electronic device, the user, even when receiving the VR service using another electronic device, may receive a VR service corresponding to a unique IPD without a calibration process.

Each of the aforementioned components of the electronic device may include one or more parts, and a name of the part may vary with a type of the electronic device. The electronic device, in accordance with various embodiments of the present invention, may include at least one of the aforementioned components, omit some of them, or include other additional component(s). Some of the components may be combined into an entity, but the entity may perform the same functions as the components.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the present invention, at least a part of the device (e.g., modules or their functions) or method (e.g., operations) may be implemented as instructions stored in a computer-readable storage medium e.g., in the form of a program module. The instructions, when executed by a controller (e.g., the processor 120), may enable the processor to carry out a corresponding function. The computer-readable storage medium may be, e.g., the memory 130.

The computer-readable storage medium may include a hardware device, such as hard discs, floppy discs, and magnetic tapes (e.g., a magnetic tape), optical media such as compact disc read only memories (ROMs) (CD-ROMs) and digital versatile discs (DVDs), magneto-optical media such as floptical disks, ROMs, random access memories (RAMs), flash memories, and/or the like. Examples of the program instructions may include not only machine language codes but also high-level language codes, which are executable by various computing means using an interpreter. The aforementioned hardware devices may be configured to operate as one or more software modules to carry out embodiments of the present invention, and vice versa.

Modules or programming modules, in accordance with various embodiments of the present invention, may include at least one or more of the aforementioned components, omit some of them, or further include other additional components. Operations performed by modules, programming modules or other components in accordance with various embodiments of the present invention may be carried out sequentially, simultaneously, repeatedly, or heuristically. Furthermore, some of the operations may be performed in a different order, or omitted, or include other additional operation(s).

As is apparent from the foregoing description, according to embodiments of the present invention, an IPD may be determined per user, thus allowing each user to be served a VR service fitting the user.

According to embodiments of the present invention, an IPD may be determined when an HMT apparatus is worn in contrast to the legacy captured image-based schemes, enabling more exact IPD measurement.

According to embodiments of the present invention, a VR application may update an IPD determined per user, offering more real-life VR services to the users.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method for controlling an electronic device, the method comprising:
    displaying, on a display of the electronic device, an image comprising a first object corresponding to a left eye of a user of the electronic device, and a second object corresponding to a right eye of the user;
    gradually adjusting a distance between the first object and the second object through subsequently displayed images on the display;
    gradually adjusting a size of each of the first object and the second object as a distance between the first object and the second object is adjusted, wherein, as the distance decreases, the size of each of the first object and the second object increases, and as the distance increases, the size of each of the first object and the second object decreases;
    receiving a threshold distance between the first object and the second object, which is one of a minimum distance and a maximum distance between the first object and the second object for forming an image corresponding to the first object and the second object, while gradually adjusting the distance between the first object and the second object, wherein the image is formed at a point where a straight line passing through a left eye of a user and the first object crosses a straight line passing through a right eye of the user and the second object; and determining an interpupillary distance (IPD) between the left eye and the right eye of the user corresponding to the received threshold distance between the first object and the second object.

2. The method of claim 1, further comprising receiving a distance adjustment command for gradually adjusting the distance between the first object and the second object.

3. The method of claim 2, wherein gradually adjusting the distance between the first object and the second object comprises adjusting and displaying the distance between the first object and the second object based on the received distance adjustment command.

4. The method of claim 1, wherein determining the IPD between the left eye and the right eye of the user comprises:
obtaining a standard IPD and a standard threshold distance; and
determining the IPD between the left eye and the right eye of the user based on the standard IPD, the standard threshold distance, and the received threshold distance.

5. The method of claim 1, further comprising:
correcting a virtual reality (VR) image stored in the electronic device based on the determined IPD between the left eye and the right eye of the user, when the user uses a VR application; and
displaying the corrected VR image based on the determined IPD between the left eye and the right eye of the user.

6. The method of claim 1, further comprising updating an IPD value of a virtual reality (VR) application based on the determined IPD between the left eye and the right eye of the user, when the user uses the VR application.

7. The method of claim 1, further comprising displaying a grid-shaped reference object proximate to the image.

8. The method of claim 1, further comprising displaying two cross-shaped (+) objects respectively corresponding to the left eye and the right eye.

9. The method of claim 1, further comprising storing user identification information of the user and the IPD between the left eye and the right eye of the user in association with each other.

10. An electronic device, comprising:
a display configured to display an image comprising a first object corresponding to a left eye of a user of the electronic device, and a second object corresponding to a right eye of the user on a display of the electronic device; and
a controller configured to:
gradually adjust a distance between the first object and the second object through subsequently displayed images on the display,
gradually adjusting a size of each of the first object and the second object as a distance between the first object and the second object is adjusted, wherein, as the distance decreases, the size of each of the first object and the second object increases, and as the distance increases, the size of each of the first object and the second object decreases,
receive a threshold distance between the first object and the second object, which is one of a minimum distance and a maximum distance between the first object and the second object for forming an image corresponding to the first object and the second object, while gradually adjusting the distance between the first object and the second object, wherein the image is formed at a point where a straight line passing through a left eye of a user and the first object crosses a straight line passing through a right eye of the user and the second object, and
determine an interpupillary distance (IPD) between the left eye and the right eye of the user corresponding to the received threshold distance between the first object and the second object.

11. The electronic device of claim 10, whether the controller is further configured to receive a distance adjustment command for adjusting the distance between the first object and the second object.

12. The electronic device of claim 11, wherein the controller is further configured to gradually adjust and display the distance between the first object and the second object based on the received distance adjustment command.

13. The electronic device of claim 10, wherein the controller is further configured to obtain a standard IPD and a standard threshold distance, and determine the IPD between the left eye and the right eye of the user based on the standard IPD, the standard threshold distance, and the received threshold distance.

14. The electronic device of claim 10, wherein the controller is further configured to:
correct a virtual reality (VR) image stored in the electronic device based on the determined IPD between the left eye and the right eye of the user, when the user uses a VR application; and
control the display to display the corrected VR image based on the determined IPD between the left eye and the right eye of the user.

15. The electronic device of claim 10, wherein the controller is further configured to update an IPD value of a virtual reality (VR) application based on the determined IPD between the left eye and the right eye of the user.

16. The electronic device of claim 10, wherein the display is further configured to display a grid-shaped reference object proximate to the image.

17. The electronic device of claim 10, wherein the display is further configured to display two cross-shaped (+) objects respectively corresponding to the left eye and the right eye.

18. A non-transitory computer-readable storage medium storing a virtual reality (VR) application including a first interpupillary distance (IPD), the VR application:
displaying, on a display of an electronic device, in image comprising a first object corresponding to a left eye of a user of the electronic device, and a second object corresponding to a right eye of a user of the electronic device;
gradually adjusting a distance between the first object and the second object through subsequently displayed images on the display;
gradually adjusting a size of each of the first object and the second object as a distance between the first object and the second object is adjusted, wherein, as the distance decreases, the size of each of the first object and the second object increases, and as the distance increases, the size of each of the first object and the second object decreases;
receiving a threshold distance between the first object and the second object, which is one of a minimum distance and a maximum distance between the first object and the second object for forming an image corresponding to the first object and the second object, while gradually adjusting the distance between the first object and the second object, wherein the image is formed at a point where a straight line passing through a left eye of a user and the first object crosses a straight line passing through a right eye of the user and the second object;

determining a second IPD between the left eye and the right eye corresponding to the received threshold distance between the first object and the second object;

updating the first IPD to the second IPD; and displaying a VR image stored in the electronic device based on the second IPD.

* * * * *